United States Patent [19]
Cole

[11] Patent Number: 6,068,136
[45] Date of Patent: May 30, 2000

[54] PORTABLE BRACKET ASSEMBLY

[76] Inventor: Thomas E. Cole, P.O. Box 447, New Brighton, Pa. 15066

[21] Appl. No.: 09/102,276

[22] Filed: Jun. 22, 1998

[51] Int. Cl.[7] .............................. A47G 19/08; B60R 9/02; G09F 7/18

[52] U.S. Cl. ..................... 211/41.14; 224/570; 224/571; 248/228.6

[58] Field of Search .......................... 211/41.14; 206/454, 206/449, 448, 707, 519; 224/536, 537, 570, 571, 548, 552, 545, 525, 524, 523, 522, 510, 501; 248/228.6, 231.71, 231.85; 403/13, 14

[56] References Cited

U.S. PATENT DOCUMENTS

| | | | |
|---|---|---|---|
| 1,780,277 | 11/1930 | Seeley et al. | 224/536 X |
| 2,195,955 | 4/1940 | Hillenbrand | 248/231.85 |
| 3,719,284 | 3/1973 | Rasmusson et al. | 211/41.14 X |
| 4,033,597 | 7/1977 | Boyer | 211/41.14 X |
| 4,278,175 | 7/1981 | Jackson | 211/41.14 X |
| 4,717,055 | 1/1988 | San Juan | 224/571 X |
| 4,823,952 | 4/1989 | Fletcher et al. | 206/454 X |

*Primary Examiner*—Daniel P. Stodola
*Assistant Examiner*—Erica B. Harris
*Attorney, Agent, or Firm*—H. Keith Hauger, Esq.

[57] ABSTRACT

A portable bracket assembly which is constructed of two angularly disposed structural members which generally run parallel to each other for engagement to spaced horizontal members of a rack for holding sheet-like material. One structural member has a step like configuration wherein a horizontally disposed lower leg has a widened surface designed to hold sheet-like material. The remaining and second structural member coordinates with the first structural member to be fastened together to abut against outside and inside surfaces of the spaced horizontal member of the rack.

5 Claims, 2 Drawing Sheets

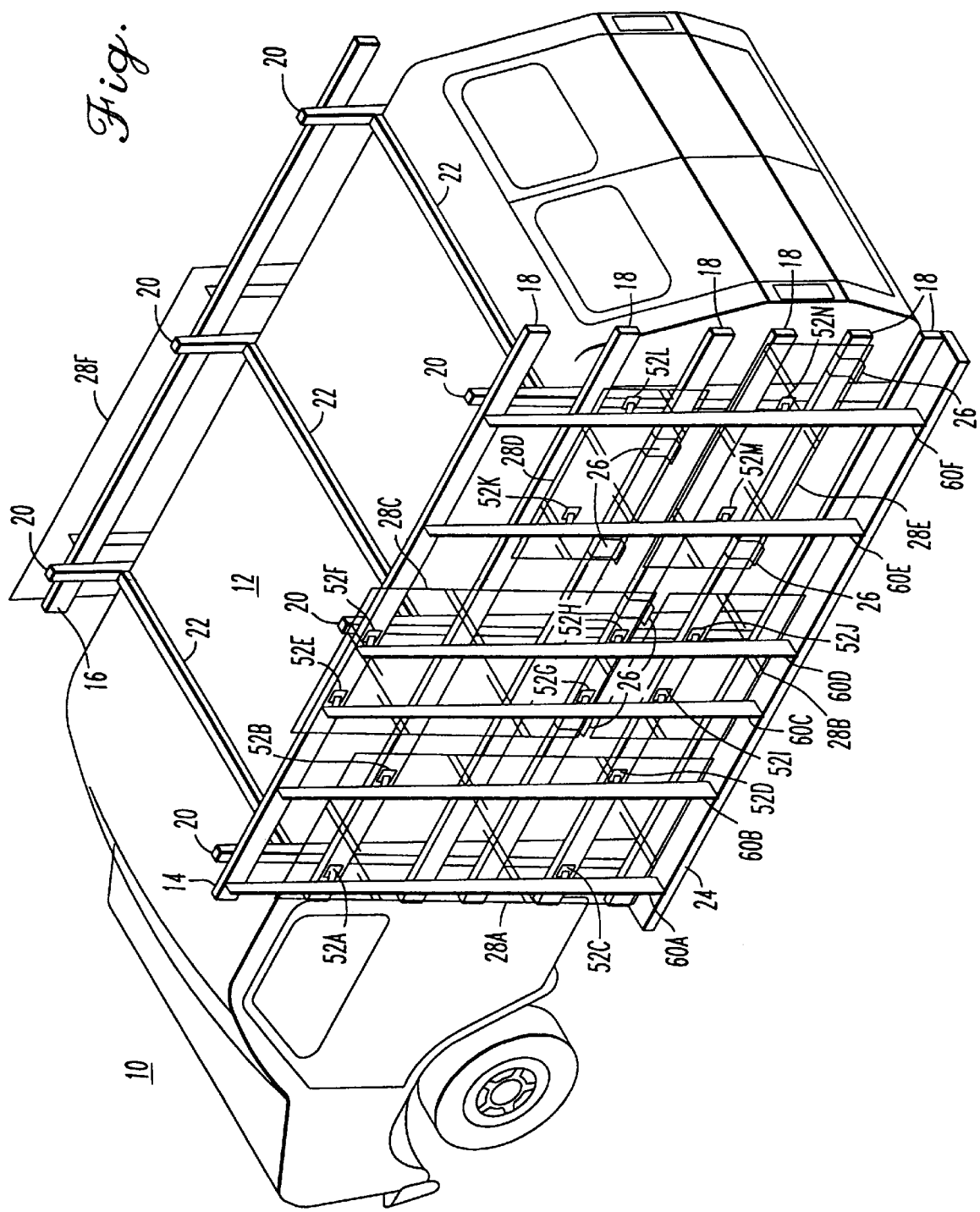

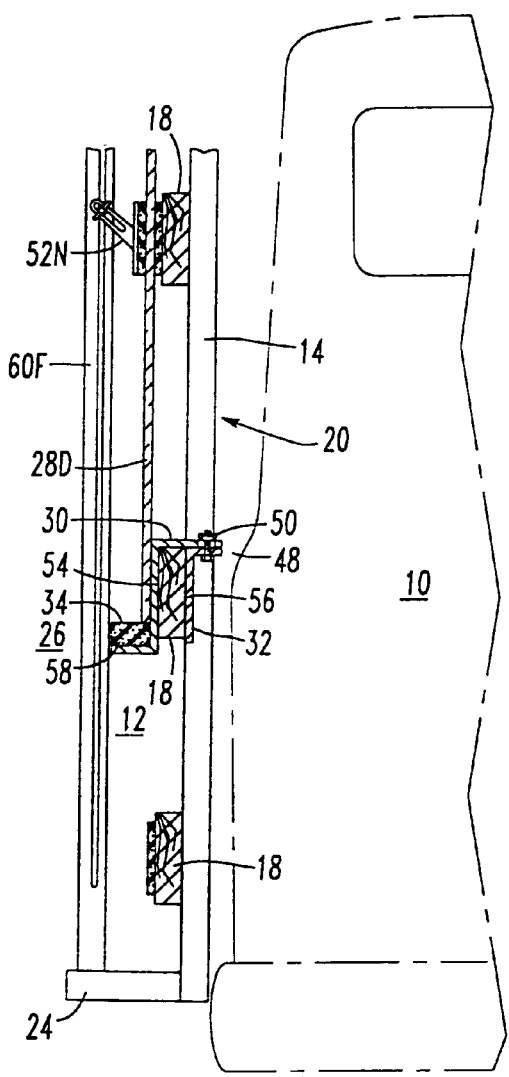
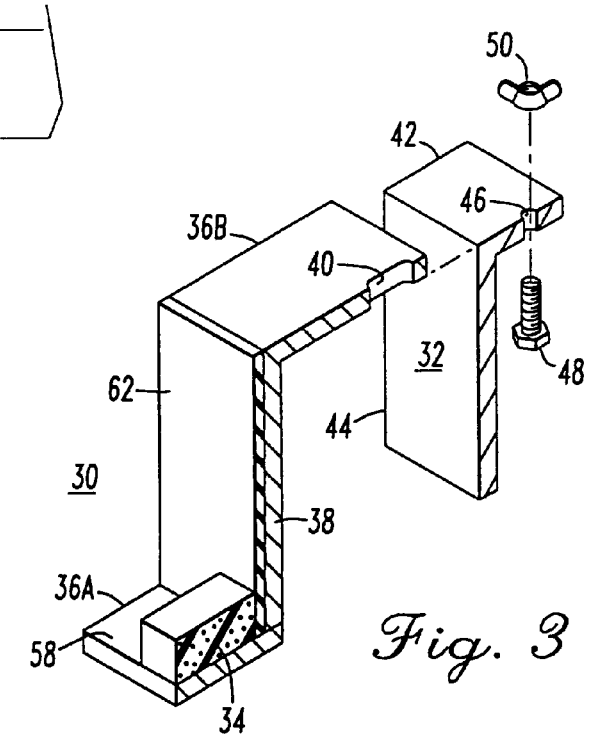

PORTABLE BRACKET ASSEMBLY

BACKGROUND OF THE PRESENT INVENTION

1. Field of the Invention

This invention relates to a portable bracket assembly for attachment to a rack generally mounted on or to a truck body enabling sheet-like material of various sizes and dimensions to be safely and efficiently transported.

2. Description of the Prior Art

Sheet material, in particular, glass plate is commonly transported on a rack designed to hold, support and secure same during transportation thereof. Current rack designs are standard in the trade consisting of an integral unit with vertical and horizontal support members mounted on each side of a truck body. Sheet material, in particular, glass plate is supported on a horizontal holding ledge located at the lower level of a rack and is clamped in standard fashion to the rack by a variety of clamp designs. Barko U.S. Pat. No. 3,412,867 entitled *Glass Rack Trucks* is illustrative of a suction-type holding mechanism in common usage on glass rack holding trucks. A second clamping bracket for plate glass is shown in Schodorf U.S. Pat. No. 2,887,231 whereby the bracket mounts to a structural member of the glass rack to secure plate glass vertically supported at the bottom of the rack.

SUMMARY OF THE INVENTION

It is, therefore, an object of the present invention to provide a portable bracket assembly that increases the storage capacity of an existing glass rack and any other type of rack holding sheet-like materials.

It is the further object of this invention to provide a portable bracket assembly that is usable on racks located on vehicles, in warehouses, storage areas or elsewhere.

It is the further object of this invention to provide a portable bracket assembly that is simply constructed and cost efficient to produce.

It is the further object of this invention to provide a portable bracket assembly that permits plate glass or any sheet-like material to be located at any point on a rack.

It is the further object of this invention to provide a portable bracket assembly that is easy to install or remove and that is adaptable to any type of holding rack.

It is the further object of this invention to provide a portable bracket assembly that represents a substantial improvement to the particular art of plate glass rack holding storage and transportation.

It is the further object of this invention to provide a portable bracket assembly that utilizes a cushioning block to prevent breakage during loading, unloading and transportation of plate glass and other sheet-like materials.

More specifically, the present invention is a portable bracket assembly, comprising two opposing structural members in an angular disposition relative to each other; wherein said opposing structural members comprise a first structural member having a stepped construction with a first level and a second level, whereon said first level has a widened upper surface area for holding sheet-like material, and wherein said second level comprises an elongated slot for engagement by a fastening means to said second structural member, said first level is integrally connected to said second level by a vertical connecting member; wherein said second structural member partially corresponds to said first structural member, specifically a horizontal level of said second structural member comprises an orifice opposing said elongated slot in said second level of said first structural member, whereby said horizontal level of said second structural member corresponds to said second level of said first structural member and a vertical structural member of said second structural member integrally connects said horizontal level whereby said vertical structural member of said second structural member corresponds to said vertical connecting member of said first structural member; said fastening means enables engagement of said portable bracket assembly to a rack by abutment of said first structural member to an outside surface of a horizontal structural member of said rack and said second structural member by abutment to an inside surface of said horizontal structural member of said rack.

These objects, as well as other objects and advantages of the present invention will become apparent from the following description, in reference to the illustrations appended hereto.

BRIEF DESCRIPTION OF THE DRAWINGS

For a better understanding of the invention, reference may be had to the accompanying drawings in which:

FIG. 1 is a perspective view of a truck body wherein a plurality of portable bracket assemblies are portrayed holding and supporting various sizes of plate glass at any given location on a glass rack.

FIG. 2 is an end view of a truck body showing a portable bracket assembly secured to a horizontal support member of a glass rack for supporting and holding plate glass.

FIG. 3 is an exploded perspective view of a portable bracket assembly showing its component parts.

DESCRIPTION OF PREFERRED EMBODIMENTS

The present invention has particular application to glass racks for holding a plurality of plate glass sheets and other sheet-like materials.

Referring first to FIG. 1, there is shown a truck body 10 and mounted thereon a rack 12 having a first rack side 14 sloped inwardly from a vertical axis and a second rack side 16 sloped inwardly from a vertical axis, whereby first rack side 14 is integrally connected to second rack side 16 by cross joinder structural members 22. Both first rack side 14 and second rack side 16 are typically constructed of spaced horizontal support members 18, spaced vertical support members 20 and holding ledge 24 located at the foot of first rack side 14 and second rack side 16. Sheet-like material of any type, and in particular, plate glass 28A, 28B, 28C, 28D, 28E and 28F are commonly supported by resting a lower edge of plate glass 28A, 28B, 28C, 28D, 28E and 28F on holding ledge 24 and by leaning inwardly against horizontal support members 18 and vertical support members 20. Plate glass 28A, 28B, 28C, 28D, 28E and 28F are secured to rack 12 by glass clamps 52A, 52B, 52C, 52D, 52E, 52F, 52G, 52H, 52I, 52J, 52K, 52L, 52M and 52N which are similar to those disclosed in U.S. Pat. No. 2,887,231 issued to Otter L. Schodorf, Sr. Glass clamps 52A, 52B, 52C, 52D, 52E, 52F, 52G, 52H, 52I, 52J, 52K, 52L, 52M and 52N are attached to associated rails 60A, 60B, 60C, 60D, 60E and 60F as shown in FIGS. 1 and 2. The within-disclosed portable bracket assembly 26 enables plate glass 28A, 28B, 28C, 28D, 28E and 28F to be supported at any given point where there is a horizontal support member 18 on either first rack side 14 or second rack side 16 of rack 12 instead of the traditional method of support on holding ledge 24.

As viewed in FIG. 2, portable bracket assembly 26 in assembled form comprises a zee-structural plate 30 and L-angular structural plate 32 opposing each other in an angular disposition. Sheet-like material 28 is shown resting on setting block 34 which is preferably constructed of a neoprene material or the like. Setting block 34 is secured to an upper surface 58 of zee-horizontal leg (1) 36A and acts to cushion brittle materials such as plate glass 28A, 28B, 28C, 28D, 28E and 28F to prevent breakage during loading, unloading and/or transportation. A means of fastening said portable bracket assembly 26 is utilized to enable engagement of zee-structural plate 30 by abutting to an outer surface 54 of horizontal support member 18 and in coordination therewith L-angular structural plate 32 abuts to an inside surface 56 of horizontal support member 18. Glass clamp 52N is shown as attached to outer vertical support member 60F and functions to tightly secure plate glass 28D against first rack side 14.

FIG. 3 particularly illustrates the assemblage of a structural framework of portable bracket assembly 26 constructed preferably from a rigid and durable material such as aluminum, steel, fiberglass or a like material and coated with rubberized coating 62 on outer surface of zee-vertical connecting member 38 for protection of said plate glass 28A, 28B, 28C, 28D, 28E and 28F. A variety of fastening means are available to connect zee-structural plate 30 to L-angular structural plate 32, but one of the preferred embodiments is a nut and bolt means consisting of bolt 48 and wing nut 50. Zee-structural plate 30 is shown having zee-horizontal leg (1) 36A and zee-horizontal leg (2) 36B which are integrally connected to each other by a centrally disposed zee-vertical connecting member 38. L-angular structural plate 32 consists of an L-horizontal leg 42 integrally connected to an L-vertical leg 44 wherein through L-horizontal leg 42 is located an orifice 46 opposing an elongated slot 40 located in zee-horizontal leg (2) 36B whereby said bolt 48 is inserted through orifice 46 and elongated slot 40 which allows by slide movement of zee-structural plate 38 relative to L-angular structural plate 32 adjustment to the thickness of horizontal support member 18 for properly securing portable bracket assembly 26 thereto. Upon tightening wing nut 50 to bolt 48 which generally is threaded, portable bracket assembly 26 abuts to horizontal support member 18 at outer surface 54 where zee-vertical connecting member 38 makes contact and at inner surface 56 where L-vertical leg 44 makes contact. It is appreciated that zee-structural plate 30 and L-angular structural plate 32 may be constructed of various sizes, widths and materials. It is also appreciated that while portable bracket assembly 26 has particular use for holding plate glass 28A, 28B, 28C, 28D, 28E and 28F, it is also quite capable of holding any sheet-like material.

While the present invention has been described in connection with the preferred embodiment thereof, it should be understood that there may be other embodiments which fall within the spirit and scope of the invention as defined by the following Claims.

In accordance with the provisions of the patent statutes, I have explained the principle and operation of my invention and have illustrated and described what I consider to represent the best embodiment thereof.

I claim:

1. A portable bracket assembly having two opposing plates in angular disposition, comprising:

one of said plates is a zee-structural plate having a first horizontal leg with a flat upper surface for holding sheet-like material and a second horizontal leg integrally connected to said first horizontal leg by a centrally disposed vertical connecting member, wherein said second horizontal leg comprises an elongated slot;

a second of said plates is an L-angular structural plate opposing said zee-structural plate, wherein said L-angular structural plate consists of an L-horizontal leg integrally connected to an L-vertical leg having an orifice located in said L-horizontal leg opposing said elongated slot of said second horizontal leg for connection of said zee-structural plate to said L-structural plate by a fastening means such that said horizontal leg of said zee-structural plate overlaps the horizontal leg of said L-angular structural plate when the two plates are connected;

wherein the insertion of said fastening means through said elongated slot of said zee-structural plate and said orifice of said L-angular structural plate enables engagement of said zee-structural plate and said L-angular structural plate to a rack such that said vertical connecting member of said zee-structural plate will abut to an outer surface of a horizontal support member of said rack, and said L-vertical leg of said L-angular structural plate will abut to an inside surface of said horizontal support member of said rack.

2. A portable bracket assembly according to claim 1, wherein said portable bracket assembly functions to hold said sheet-like material by locating said portable bracket assembly at any given point on said rack enabling a plurality of said sheet-like materials of various sizes to be secured to said rack.

3. A portable bracket assembly according to claim 2, wherein said zee-structural plate consists of a setting block secured to said flat upper surface of said first horizontal leg, wherein said setting block functions to cushion said sheet-like material during loading, unloading and transportation of said sheet-like material on said rack.

4. A portable bracket assembly according to claim 3, wherein said fastening means comprises a nut and bolt assembly, said nut and bolt assembly is inserted into said orifice located in said L-horizontal leg of said L-angular structural member and through said opposing elongated slot of said L-horizontal leg of said zee-structural plate, whereby said zee-structural plate may be engaged to a top surface of said L-horizontal leg of said L-angular structural plate and adjusted to a thickness of said horizontal support member of said rack by slide movement of said zee-structural plate relative to said L-angular structural plate.

5. A portable bracket assembly according to claim 4, wherein said zee-structural plate and said L-angular structural plate are constructed of a rigid material having a rubberized coating to protect said sheet-like material from damage and breakage.

* * * * *